US011102134B2

(12) United States Patent
Li et al.

(10) Patent No.: US 11,102,134 B2
(45) Date of Patent: Aug. 24, 2021

(54) METHOD AND APPARATUS FOR DETERMINING CONTENTION WINDOW SIZE IN CLEAR CHANNEL ASSESSMENT

(71) Applicant: HUAWEI TECHNOLOGIES CO., LTD., Guangdong (CN)

(72) Inventors: Yuan Li, Beijing (CN); Lei Guan, Beijing (CN)

(73) Assignee: Huawei Technologies Co., Ltd., Guangdong (CN)

(*) Notice: Subject to any disclaimer, the term of this patent is extended or adjusted under 35 U.S.C. 154(b) by 12 days.

(21) Appl. No.: 16/146,880

(22) Filed: Sep. 28, 2018

(65) Prior Publication Data

US 2019/0036831 A1    Jan. 31, 2019

Related U.S. Application Data

(63) Continuation of application No. PCT/CN2016/078182, filed on Mar. 31, 2016.

(51) Int. Cl.
*H04L 12/807* (2013.01)
*H04W 74/08* (2009.01)
*H04W 72/04* (2009.01)

(52) U.S. Cl.
CPC ........... *H04L 47/27* (2013.01); *H04W 72/042* (2013.01); *H04W 74/08* (2013.01); *H04W 74/0816* (2013.01)

(58) Field of Classification Search
CPC .......................... H04L 47/27; H04W 74/0816; H04W 72/042; H04W 74/08; H04W 74/002
See application file for complete search history.

(56) References Cited

U.S. PATENT DOCUMENTS

| 10,708,000 B2* | 7/2020 | He ........................ H04L 1/1867 |
| 2010/0273506 A1* | 10/2010 | Stern-Berkowitz .......................... H04L 5/0048 455/456.1 |

(Continued)

FOREIGN PATENT DOCUMENTS

| CN | 102883461 A | 1/2013 |
| CN | 105101446 A | 11/2015 |
| CN | 105284173 A | 1/2016 |
| CN | 105338615 A | 2/2016 |
| CN | 105338651 A | 2/2016 |

(Continued)

OTHER PUBLICATIONS

3GPP TS 36.213 V13.1.0 (Mar. 2016),3rd Generation Partnership Project;Technical Specification Group Radio Access Network;Evolved Universal Terrestrial Radio Access (E-UTRA);Physical layer procedure(Release 13),total 361 pages.

(Continued)

*Primary Examiner* — Andrew Lai
*Assistant Examiner* — Mohammed M Murshid
(74) *Attorney, Agent, or Firm* — Fish & Richardson P.C.

(57) ABSTRACT

A method for determining a contention window size in clear channel assessment, including: determining, at least one user equipment first UE that occupies an uplink subframe on an unlicensed carrier and that is in at least one UE scheduled in a reference subframe, where the uplink subframe is an uplink subframe in which at least one UE scheduled by the base station in the reference subframe feeds back a hybrid automatic repeat request HARQ status for the reference subframe; and determining, a CWS in CCA for downlink transmission based on a HARQ status of the at least one first UE that occupies the uplink subframe.

15 Claims, 3 Drawing Sheets

(56) References Cited

U.S. PATENT DOCUMENTS

| | | |
|---|---|---|
| 2011/0223924 A1* | 9/2011 | Lohr et al. |
| 2015/0195855 A1 | 7/2015 | Liu et al. |
| 2016/0057770 A1* | 2/2016 | Yerramalli ............ H04W 52/54 370/329 |
| 2017/0005768 A1* | 1/2017 | Yin ....................... H04W 74/08 |
| 2017/0041951 A1* | 2/2017 | Yin ....................... H04W 72/04 |
| 2017/0230838 A1* | 8/2017 | Yerramalli ........ H04W 72/0453 |
| 2017/0238122 A1 | 8/2017 | Yang |
| 2017/0280475 A1* | 9/2017 | Yerramalli et al. |
| 2018/0092128 A1* | 3/2018 | Um ................... H04W 74/0808 |
| 2018/0124828 A1 | 5/2018 | Kim et al. |
| 2018/0175975 A1* | 6/2018 | Um ....................... H04L 1/1816 |
| 2018/0254854 A1* | 9/2018 | He et al. |
| 2018/0254858 A1* | 9/2018 | He ................... H04W 74/0808 |
| 2019/0281631 A1 | 9/2019 | Bhushan et al. |

FOREIGN PATENT DOCUMENTS

| | | |
|---|---|---|
| EP | 2757850 A1 | 7/2014 |
| WO | 2016182355 A1 | 11/2016 |

OTHER PUBLICATIONS

International Search Report and Written Opinion issued in International Application No. PCT/CN2016/078182 dated Dec. 15, 2016, 18 pages.

XP051054333 R1-161029 ITL,"UL LBT design in Rel-14 eLAA",3GPP TSG RAN WG1 meeting #84,St Julian's, Malta, Feb. 15-19, 2016,total 6 pages.

XP051003113 R1-156733 Lenovo,"Contention window size adjustment for LBT Category 4 for LAA PDSCH transmission",3GPP TSG RAN WG1 Meeting #83,Anaheim, USA, Nov. 15-22, 2015,total 6 pages.

XP051002369 R1-155464 Samsung,"Remaining details of DL LBT",3GPP TSG RAN WG1 Meeting #82bis,Malmo, Sweden, Oct. 5-9, 2015,total 8 pages.

Extended European Search Report issued in European Application No. 16896002.9 dated Jan. 31, 2019, 11 pages.

Qualcomm Incorporated, "Remaining details of window adaptation trigger mechanism", 3GPP TSG-RAN WG1#83 R1-157038, Nov. 22, 2016, 2 pages.

LG Electronics, "DL LBT design in LAA", 3GPP TSG-RAN WG1#83 R1-156856, Nov. 22, 2015, 6 pages.

Huawei HiSilicon, "Contension window size adjustment for UL eategory 4 LBT for eLAA", 3GPP TSG-RAN WG1#84b R1-162129, Apr. 15, 2016, 4 pages.

Office Action issued in Japanese Application No. 2018/551,803 dated Aug. 30, 2019, 8 pages (With English Translation).

Office Action issued in Chinese Application No. 201680083754.5 dated Jan. 2, 2020, 18 pages (with English translation).

Samsung, "Remaining details of HARQ-ACK based CWS adaptation," 3GPP TSG RAN WG1 Meeting #83, R1-156761; Anaheim, USA, Nov. 15-22, 2015, 6 pages.

* cited by examiner

METHOD AND APPARATUS FOR DETERMINING CONTENTION WINDOW SIZE IN CLEAR CHANNEL ASSESSMENT

CROSS-REFERENCE TO RELATED APPLICATIONS

This application is a continuation of International Application No. PCT/CN2016/078182, filed on Mar. 31, 2016, the disclosure of which is hereby incorporated by reference in its entirety.

TECHNICAL FIELD

The present invention relates to the field of communications technologies, and in particular, to a method and an apparatus for determining a contention window size in clear channel assessment.

BACKGROUND

In a licensed-assisted access using Long Term Evolution (LAA-LTE) system, an available frequency spectrum may be extended to an unlicensed band by using a carrier aggregation (CA) technology. A licensed spectrum is used to implement seamless coverage and carry some services with a high time delay requirement, and an unlicensed spectrum is used to carry some data services. To implement friendly coexistence of the LAA-LTE system and another system such as a Wi-Fi system on the unlicensed spectrum, the LAA system may use a listen before talk (LBT) channel access mechanism, to perform detection on a communications channel through clear channel assessment (CCA). A dynamically-changing contention window size (CWS) is used in the LBT channel access mechanism for LAA downlink transmission when detection is performed on the communications channel through CCA. A CWS in each time of CCA may be determined based on a hybrid automatic repeat request (HARQ) status of user equipment (UE).

In the prior art, a base station performs downlink transmission on the unlicensed spectrum, and the base station determines a CWS of scheduled UE based on a HARQ status fed back by the UE. If the UE fails to perform LBT, the UE cannot feed back a HARQ status in an uplink subframe on an unlicensed carrier. In this case, if the base station directly determines the CWS of the scheduled UE based on the HARQ status fed back by the UE, a probability that the CWS is incorrectly determined is relatively high. In the prior art, whether the UE successfully performs LBT is not determined, and a CWS of UE is directly determined based on a HARQ status fed back by the UE. Consequently, the probability that the CWS is incorrectly determined increases, and a probability of increasing a waiting time of a base station increases.

SUMMARY

Embodiments of this application provide a method and an apparatus for determining a contention window size in clear channel assessment, to improve accuracy of determining a CWS for downlink transmission, and reduce a probability of increasing a waiting time of a base station due to an adjusted excessively large CWS.

A first aspect provides a method for determining a contention window size in clear channel assessment. The method may include:

determining, by a base station, at least one user equipment UE that occupies an uplink subframe on an unlicensed carrier and that is in at least one UE scheduled in a reference subframe, where the uplink subframe is an uplink subframe in which at least one UE scheduled by the base station in the reference subframe feeds back a hybrid automatic repeat request HARQ status for the reference subframe; and determining, by the base station, a contention window size CWS in clear channel assessment CCA for downlink transmission based on a HARQ status of the at least one UE that occupies the uplink subframe.

In this application, when the CWS in the CCA for the downlink transmission is determined, only the HARQ status of the UE that occupies the uplink subframe on the unlicensed carrier can be considered while a HARQ status of UE that does not occupy the uplink subframe on the unlicensed carrier is not considered, so as to avoid a case in which the CWS is incorrectly determined because the HARQ status of the UE that does not occupy the uplink subframe on the unlicensed carrier is incorrectly determined. Therefore, accuracy of determining the CWS for the downlink transmission can be improved, and a probability of increasing a waiting time of the base station due to an adjusted excessively large CWS can be reduced.

Optionally, the determining, by a base station, at least one UE that occupies an uplink subframe on an unlicensed carrier and that is in at least one UE scheduled in a reference subframe includes:

if the base station finds that at least one UE scheduled in the reference subframe occupies a HARQ resource in the uplink subframe to feed back a HARQ status, determining that the at least one UE that occupies the HARQ resource in the uplink subframe to feed back the HARQ status occupies the uplink subframe, where the HARQ resource is a physical layer resource carrying the HARQ status fed back by the UE.

In this application, the detected UE that occupies the HARQ resource in the uplink subframe on the unlicensed carrier to feed back the HARQ status and that is in one or more UEs scheduled in the reference subframe may be determined as the UE that occupies the uplink subframe. When the CWS in the CCA for the downlink transmission is determined, only the HARQ status of the UE that occupies the HARQ resource in the uplink subframe on the unlicensed carrier to feed back the HARQ status is considered while a HARQ status of UE that does not occupy the HARQ resource in the uplink subframe on the unlicensed carrier to feed back a HARQ status is not considered, so as to avoid, to a greater extent, the case in which the CWS is incorrectly determined because the HARQ status of the UE that does not occupy the uplink subframe on the unlicensed carrier is incorrectly determined. Therefore, the probability of increasing the waiting time of the base station due to the adjusted excessively large CWS can be reduced.

Optionally, the determining, by a base station, at least one user equipment UE that occupies an uplink subframe on an unlicensed carrier and that is in at least one UE scheduled in a reference subframe, includes:

if the base station finds that at least one UE scheduled in the reference subframe does not occupy a HARQ resource in the uplink subframe to feed back a HARQ status, and finds that the at least one UE that does not occupy the HARQ resource in the uplink subframe to feed back the HARQ status occupies an uplink resource other than the HARQ resource in the uplink subframe, determining that the at least one UE that occupies the uplink resource other than the HARQ resource in the uplink subframe occupies the uplink subframe, where the HARQ resource is a physical layer resource carrying the HARQ status fed back by the UE.

In this application, the detected UE that is in the one or more UEs scheduled in the reference subframe and that does not occupy the HARQ resource in the uplink subframe on the unlicensed carrier to feed back the HARQ status but occupies the uplink resource other than the HARQ resource may be determined as the UE that occupies the uplink subframe. When the CWS in the CCA for the downlink transmission is determined, the CWS may be determined based on the HARQ status of the UE that does not occupy the HARQ resource in the uplink subframe on the unlicensed carrier to feed back the HARQ status but occupies the uplink resource other than the HARQ resource, while a HARQ status of UE that does not occupy the HARQ resource in the uplink subframe on the unlicensed carrier to feed back the HARQ status and that does not occupy the resource other than the HARQ resource is not considered, so as to avoid the case in which the CWS is incorrectly determined because the HARQ status of the UE that does not occupy the HARQ resource in the uplink subframe on the unlicensed carrier to feed back the HARQ status but occupies the another uplink resource is incorrectly determined. Therefore, the probability of increasing the waiting time of the base station due to the adjusted excessively large CWS can be reduced.

Optionally, that the base station finds that the at least one UE that does not occupy the HARQ resource in the uplink subframe to feed back the HARQ status occupies an uplink resource other than the HARQ resource in the uplink subframe includes:

if the base station finds that the UE that does not occupy the HARQ resource in the uplink subframe to feed back the HARQ status sends a demodulation reference signal DMRS, determining that the UE occupies the uplink resource other than the HARQ resource in the uplink subframe;

if the base station finds that the UE that does not occupy the HARQ resource in the uplink subframe to feed back the HARQ status sends uplink service information on a physical uplink shared channel PUSCH, determining that the UE occupies the uplink resource other than the HARQ resource in the uplink subframe; or if the base station finds that the UE that does not occupy the HARQ resource in the uplink subframe to feed back the HARQ status sends uplink control information on a physical uplink control channel PUCCH, determining that the UE occupies the uplink resource other than the HARQ resource in the uplink subframe.

In this application, that the UE occupies the uplink resource other than the HARQ resource in the uplink subframe can be determined in a manner of detecting the DMRS, detecting the uplink service information sent by the UE on the PUSCH, detecting the uplink control information sent by the UE on the PUCCH, or the like, so that diversity and efficiency of an implementation of determining the UE that occupies the uplink subframe can be improved. Therefore, the accuracy of determining the CWS for downlink transmission can be improved, and the probability of increasing the waiting time of the base station due to an adjusted excessively large CWS can be reduced.

Optionally, the uplink control information that is detected by the base station and that is sent on the PUCCH by the UE that does not occupy the HARQ resource in the uplink subframe to feed back the HARQ status includes: a scheduling request SR and/or channel state information CSI.

In this application, detecting the uplink control information sent by the UE on the PUCCH may include detecting the SR and/or the CSI, or the like, so that the uplink control information sent by the UE on the PUCCH can be specifically detected, and diversity and efficiency of an implementation of determining the UE that occupies the uplink subframe can be improved. Therefore, the accuracy of determining the CWS for the downlink transmission can be improved, and the probability of increasing the waiting time of the base station due to the adjusted excessively large CWS can be reduced.

Optionally, the determining, by a base station, at least one UE that occupies an uplink subframe on an unlicensed carrier and that is in at least one UE scheduled in a reference subframe includes:

determining that the at least one UE occupies the uplink subframe, if the base station finds that at least one UE scheduled in the reference subframe does not occupy a HARQ resource in the uplink subframe to feed back a HARQ status, and a CWS in CCA performed by the at least one UE for the uplink subframe is not greater than a first preset threshold, or an initial value of a backoff counter generated based on CWS performed by the at least one UE for the uplink subframe is not greater than a second preset threshold, where the HARQ resource is a physical layer resource carrying the HARQ status fed back by the UE.

In this application, the UE may be determined as the UE that occupies the uplink subframe if it is detected that the UE in the one or more UEs scheduled in the reference subframe does not occupy the HARQ resource in the uplink subframe on the unlicensed carrier to feed back the HARQ status, and the CWS in the CCA for the uplink subframe is not greater than the first preset threshold, or the initial value that is of the backoff counter and that is generated based on the CWS is not greater than the second preset threshold. When the CWS in the CCA for the downlink transmission is determined, the CWS may be determined based on the HARQ status of the UE that does not occupy the HARQ resource in the uplink subframe on the unlicensed carrier to feed back the HARQ status and whose CWS or the initial value of the backoff counter meets the condition, while a HARQ status of UE that does not occupy the HARQ resource in the uplink subframe on the unlicensed carrier to feed back the HARQ status and whose CWS or the initial value of the backoff counter does not meet the condition is not considered, so as to avoid a case in which the CWS is incorrectly determined because the HARQ status of the UE is incorrectly determined. Therefore, the probability of increasing the waiting time of the base station due to an adjusted excessively large CWS can be reduced.

Optionally, the determining, by a base station, at least one UE that occupies an uplink subframe on an unlicensed carrier and that is in at least one UE scheduled in a reference subframe includes:

determining that the at least one UE occupies the uplink subframe, if the base station finds that at least one UE scheduled in the reference subframe does not occupy the HARQ resource in the uplink subframe to feed back the HARQ status and does not occupy the uplink resource other than the HARQ resource, and a CWS in CCA performed by the at least one UE for the uplink subframe is not greater than a first preset threshold, or an initial value of a backoff counter generated based on CWS performed by the at least one UE for the uplink subframe is not greater than a second preset threshold.

In this application, the UE may be determined as the UE that occupies the uplink subframe if it is detected that the UE in the one or more UEs scheduled in the reference subframe does not occupy the HARQ resource in the uplink subframe on the unlicensed carrier to feed back the HARQ status and does not occupy the uplink resource other than the HARQ resource, and the CWS in the CCA for the uplink subframe is not greater than the first preset threshold, or the initial value of the backoff counter generated based on the CWS is not greater than the second preset threshold. When the CWS in the CCA for the downlink transmission is determined, the CWS may be determined based on the HARQ status of the UE that does not occupy the HARQ resource to feed back the HARQ status and does not occupy the uplink resource other than the HARQ resource and whose CWS or the initial value of the backoff counter meets the condition, while the HARQ status of the UE that does not occupy the HARQ resource in the uplink subframe on the unlicensed carrier to feed back the HARQ status and whose CWS or the initial value of the backoff counter does not meet the condition is not considered, so as to avoid the case in which the CWS is incorrectly determined because the HARQ status of the UE is incorrectly determined. Therefore, the probability of increasing the waiting time of the base station due to the adjusted excessively large CWS can be reduced.

Optionally, the determining, by a base station, at least one UE that occupies an uplink subframe on an unlicensed carrier and that is in at least one UE scheduled in a reference subframe includes:

receiving, by the base station, report information sent by at least one UE scheduled in the reference subframe, where the report information is used to indicate that the at least one UE occupies the uplink subframe; and determining, by the base station, that the at least one UE occupies the uplink subframe.

Optionally, the determining, by the base station, a contention window size CWS in clear channel assessment CCA for downlink transmission based on a HARQ status of the at least one UE that occupies the uplink subframe includes:

determining, by the base station, the CWS in the CCA for the downlink transmission based on the HARQ status of the at least one UE that occupies the uplink subframe, where a HARQ status of UE that does not occupy the uplink subframe on the unlicensed carrier and that is scheduled by the base station in the reference subframe is not used as a factor of determining the CWS in the CCA for the downlink transmission.

In this application, that the UE occupies the uplink subframe may be determined based on the report information sent by the UE. When a CWS of UE in downlink transmission is determined, only a HARQ status of UE that occupies the uplink subframe and that is indicated in the sent report information is considered, and a HARQ status of UE that does not occupy the uplink subframe is not considered, so as to avoid the case in which the CWS is incorrectly determined because the HARQ status of the UE is incorrectly determined. Therefore, the probability of increasing the waiting time of the base station due to the adjusted excessively large CWS can be reduced.

A second aspect provides an apparatus for determining a contention window size in clear channel assessment. The apparatus may include:

a first determining module, configured to: determine at least one user equipment UE that occupies an uplink subframe on an unlicensed carrier and that is in at least one UE scheduled by a base station in a reference subframe, where the uplink subframe is an uplink subframe in which at least one UE scheduled by the base station in the reference subframe feeds back a hybrid automatic repeat request HARQ status for the reference subframe; and a second determining module, configured to determine a contention window size CWS in clear channel assessment CCA for downlink transmission based on a HARQ status of the at least one UE that occupies the uplink subframe.

Optionally, the first determining module is specifically configured to:

if it is detected that at least one UE scheduled by the base station in the reference subframe occupies a HARQ resource in the uplink subframe to feed back a HARQ status, determine that the at least one UE that occupies the HARQ resource in the uplink subframe to feed back the HARQ status occupies the uplink subframe, where the HARQ resource is a physical layer resource carrying the HARQ status fed back by the UE.

Optionally, the first determining module is specifically configured to:

if it is detected that at least one UE scheduled by the base station in the reference subframe does not occupy a HARQ resource in the uplink subframe to feed back a HARQ status, and that the at least one UE that does not occupy the HARQ resource in the uplink subframe to feed back the HARQ status occupies an uplink resource other than the HARQ resource in the uplink subframe, determine that the at least one UE that occupies the uplink resource other than the HARQ resource in the uplink subframe occupies the uplink subframe, where the HARQ resource is a physical layer resource carrying the HARQ status fed back by the UE.

Optionally, the first determining module is specifically configured to:

if it is detected that the UE that does not occupy the HARQ resource in the uplink subframe to feed back the HARQ status sends a demodulation reference signal DMRS, determine that the UE occupies the uplink resource other than the HARQ resource in the uplink subframe;

if it is detected that the UE that does not occupy the HARQ resource in the uplink subframe to feed back the HARQ status sends uplink service information on a physical uplink shared channel PUSCH, determine that the UE occupies the uplink resource other than the HARQ resource in the uplink subframe; or if it is detected that the UE that does not occupy the HARQ resource in the uplink subframe to feed back the HARQ status sends uplink control information on a physical uplink control channel PUCCH, determine that the UE occupies the uplink resource other than the HARQ resource in the uplink subframe.

Optionally, the detected uplink control information sent on the PUCCH by the UE that does not occupy the HARQ resource in the uplink subframe to feed back the HARQ status includes: a scheduling request SR and/or channel state information CSI.

Optionally, the first determining module is specifically configured to:

determine that the at least one UE occupies the uplink subframe, if it is detected that at least one UE scheduled by the base station in the reference subframe does not occupy a HARQ resource in the uplink subframe to feed back a HARQ status, and a CWS in CCA performed by the at least one UE for the uplink subframe is not greater than a first preset threshold, or an initial value of a backoff counter generated based on CWS performed by the at least one UE for the uplink subframe is not greater than a second preset threshold, where the HARQ resource is a physical layer resource carrying the HARQ status fed back by the UE.

Optionally, the first determining module is specifically configured to:

determine that the at least one UE occupies the uplink subframe, if it is detected that at least one UE scheduled by the base station in the reference subframe does not occupy the HARQ resource in the uplink subframe to feed back the HARQ status and does not occupy the uplink resource other than the HARQ resource, and a CWS in CCA performed by the at least one UE for the uplink subframe is not greater than a first preset threshold, or an initial value of a backoff counter generated based on CWS performed by the at least one UE for the uplink subframe is not greater than a second preset threshold.

Optionally, the first determining module is specifically configured to:

receive report information sent by at least one UE scheduled in the reference subframe, where the report information is used to indicate that the at least one UE occupies the uplink subframe; and determine that the at least one UE occupies the uplink subframe.

Optionally, the second determining module is specifically configured to:

determine the CWS in the CCA for the downlink transmission based on the HARQ status of the at least one UE that occupies the uplink subframe, where a HARQ status of UE that does not occupy the uplink subframe on the unlicensed carrier and that is scheduled by the base station in the reference subframe is not used as a factor of determining the CWS in the CCA for the downlink transmission.

A third aspect provides a base station. The base station may include a memory and a processor, where the memory is connected to the processor;

the memory is configured to store a set of program code; and the processor is configured to invoke the program code stored in the memory, to perform the following operations:

determining at least one user equipment UE that occupies an uplink subframe on an unlicensed carrier and that is in at least one UE scheduled by a base station in a reference subframe, where the uplink subframe is an uplink subframe in which at least one UE scheduled by the base station in the reference subframe feeds back a hybrid automatic repeat request HARQ status for the reference subframe; and determining a contention window size CWS in clear channel assessment CCA for downlink transmission based on a HARQ status of the at least one UE that occupies the uplink subframe.

Optionally, the processor is specifically configured to:

if it is detected that at least one UE scheduled by the base station in the reference subframe occupies a HARQ resource in the uplink subframe to feed back a HARQ status, determine that the at least one UE that occupies the HARQ resource in the uplink subframe to feed back the HARQ status occupies the uplink subframe, where the HARQ resource is a physical layer resource carrying the HARQ status fed back by the UE.

Optionally, the processor is specifically configured to:

if it is detected that at least one UE scheduled by the base station in the reference subframe does not occupy a HARQ resource in the uplink subframe to feed back a HARQ status, and that the at least one UE that does not occupy the HARQ resource in the uplink subframe to feed back the HARQ status occupies an uplink resource other than the HARQ resource in the uplink subframe, determine that the at least one UE that occupies the uplink resource other than the HARQ resource in the uplink subframe occupies the uplink subframe, where the HARQ resource is a physical layer resource carrying the HARQ status fed back by the UE.

Optionally, the processor is specifically configured to:

if it is detected that the UE that does not occupy the HARQ resource in the uplink subframe to feed back the HARQ status sends a demodulation reference signal DMRS, determine that the UE occupies the uplink resource other than the HARQ resource in the uplink subframe;

if it is detected that the UE that does not occupy the HARQ resource in the uplink subframe to feed back the HARQ status sends uplink service information on a physical uplink shared channel PUSCH, determine that the UE occupies the uplink resource other than the HARQ resource in the uplink subframe; or if it is detected that the UE that does not occupy the HARQ resource in the uplink subframe to feed back the HARQ status sends uplink control information on a physical uplink control channel PUCCH, determine that the UE occupies the uplink resource other than the HARQ resource in the uplink subframe.

Optionally, the detected uplink control information sent on the PUCCH by the UE that does not occupy the HARQ resource in the uplink subframe to feed back the HARQ status includes: a scheduling request SR and/or channel state information CSI.

Optionally, the processor is specifically configured to:

determine that the at least one UE occupies the uplink subframe, if it is detected that at least one UE scheduled by the base station in the reference subframe does not occupy a HARQ resource in the uplink subframe to feed back a HARQ status, and a CWS in CCA performed by the at least one UE for the uplink subframe is not greater than a first preset threshold, or an initial value of a backoff counter generated based on CWS performed by the at least one UE for the uplink subframe is not greater than a second preset threshold, where the HARQ resource is a physical layer resource carrying the HARQ status fed back by the UE.

Optionally, the processor is specifically configured to:

determine that the at least one UE occupies the uplink subframe, if it is detected that at least one UE scheduled by the base station in the reference subframe does not occupy the HARQ resource in the uplink subframe to feed back the HARQ status and does not occupy the uplink resource other than the HARQ resource, and a CWS in CCA performed by the at least one UE for the uplink subframe is not greater than a first preset threshold, or an initial value of a backoff counter generated based on CWS performed by the at least one UE for the uplink subframe is not greater than a second preset threshold.

Optionally, the processor is specifically configured to:

receive report information sent by at least one UE scheduled by the base station in the reference subframe, where the report information is used to indicate that the at least one UE occupies the uplink subframe; and determine that the at least one UE occupies the uplink subframe.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
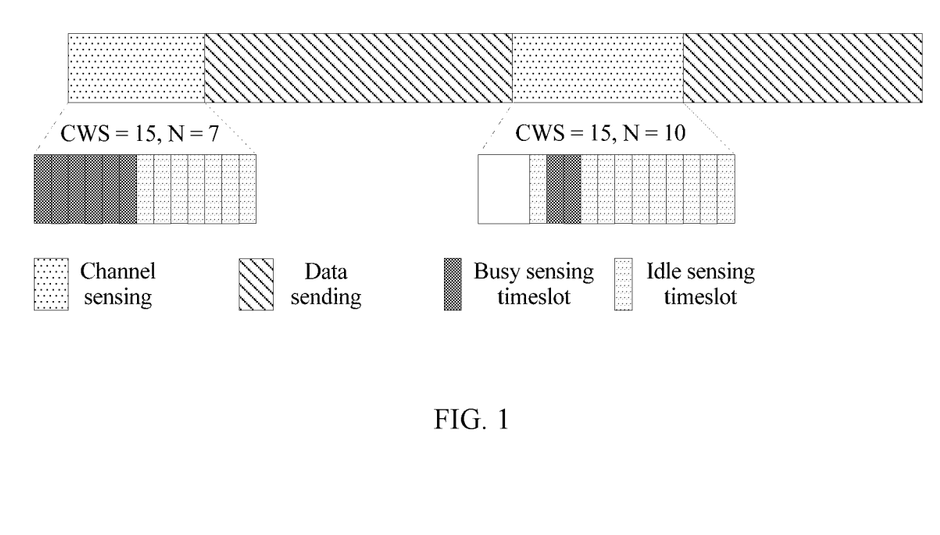
FIG. 1 is a schematic diagram of LBT in LAA downlink transmission.

Referring to FIG. 1, FIG. 1 is a schematic diagram of LBT in LAA downlink transmission. As shown in FIG. 1, a specific procedure of LBT in the LAA downlink transmission includes: A radio communications device generates a backoff counter N, where N is a random number uniformly distributed between 0 and a CWS, and performs channel sense by using a CCA timeslot as a granularity, where the CCA timeslot is a time unit for channel sense, and a typical length of the CCA timeslot is 9 μs. If it is detected in the CCA timeslot that a channel is idle, the backoff counter is decreased by 1; or if it is detected in the CCA timeslot that a channel is busy, the backoff counter is suspended, that is, the backoff counter remains unchanged. When the backoff counter is decreased to 0, the radio communications device may occupy the channel. A CWS in each time of CCA may be determined based on a HARQ status of UE. In a Long Term Evolution (Long Term Evolution, LTE) system, the HARQ status of the UE is a feedback indicating whether the UE correctly receives a downlink subframe. The HARQ status of the UE may include an ACK state, a NACK state, a DTX state, and the like. A base station may determine a CWS in CCA based on a proportion occupied by the NACK state in the HARQ status of the UE.

Figure 2:
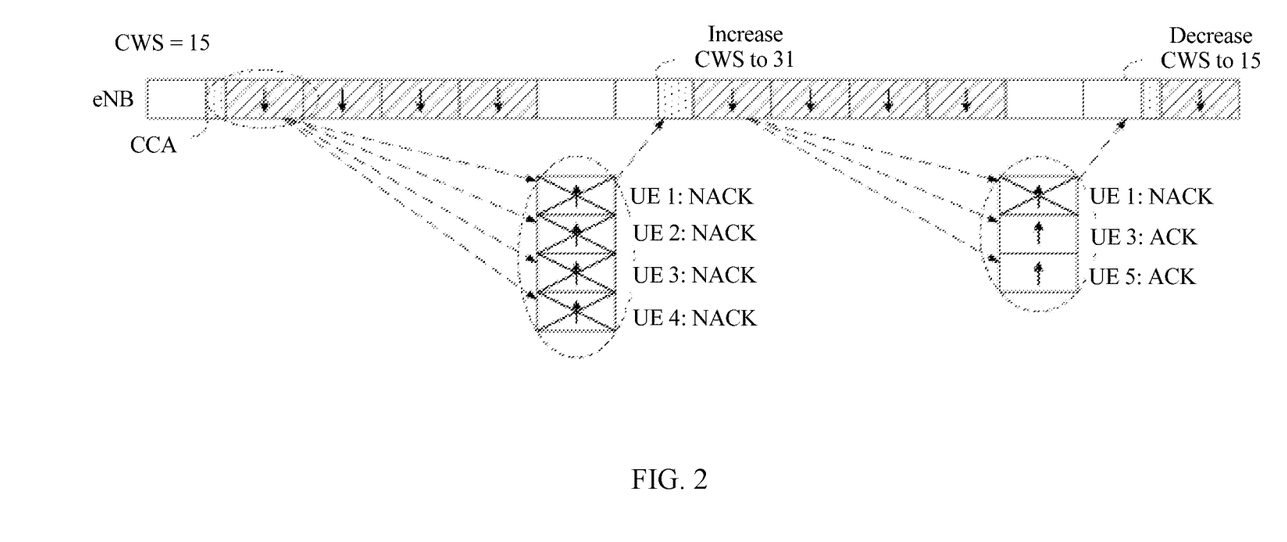
FIG. 2 is a schematic diagram of a manner of adjusting a CWS of UE in LAA downlink transmission.

It should be noted that the base station determines an initial value of a CWS as a minimum value in a CWS value set. Before performing CCA for downlink transmission, the base station adjusts a CWS based on a received HARQ status for a reference subframe. A specific adjustment manner may be as follows: If the base station finds that more than a certain proportion (for example, 80%) of HARQ statuses corresponding to UEs scheduled in the reference subframe are NACK states, the base station increases the CWS; otherwise, the base station decreases the CWS. The base station increases the CWS to a next larger CWS in the CWS value set based on a current CWS value, or the base station decreases the CWS to a minimum value in the CWS value set based on a current CWS value. As shown in FIG. 2, FIG. 2 is a schematic diagram of a manner of adjusting a CWS of UE in LAA downlink transmission. As shown in FIG. 2, it is assumed that an initial value of a CWS of the UE is 15. If a base station schedules four UEs: UE 1, UE 2, UE 3, and UE 4 in a reference subframe, and all HARQ statuses corresponding to the UE 1, the UE 2, the UE 3, and the UE 4 are NACK states, a proportion of a NACK state in the HARQ statuses corresponding to the four UEs scheduled by the base station in the reference subframe is 100%, greater than 80%. Therefore, the base station increases the CWS of the UE, and the CWS of the UE is increased to 31. Then, in a next time of downlink transmission, the base station schedules three UEs: UE 1, UE 3, and UE 5 in the reference subframe. A HARQ status corresponding to the UE 1 is a NACK state, and HARQ statuses corresponding to the UE 3 and the UE 5 are ACK states. In this case, a proportion of a NACK state in HARQ statuses corresponding to the three UEs scheduled by the base station in the reference subframe is 33.3%, less than 80%. Therefore, the base station decreases the CWS of the UE, and the CWS of the UE is decreased to 15. The reference subframe is a start subframe of the base station in downlink transmission, and the base station may obtain a HARQ status fed back by the UE for the reference subframe. If the base station and another surrounding contention node, for example, the base station and Wi-Fi, access a channel at a same time due to relatively poor channel link quality in downlink transmission, and HARQ statuses that are fed back by the UEs and that are received by the base station include a plurality of NACK states, the CWS is increased to prolong an average waiting time, so that moments at which the base station and the surrounding contention node respectively access the channel are well staggered in the next time of transmission, so as to reduce collision, reduce interference, and improve channel link quality.

In an LTE system, if the base station schedules UE (which is assumed as UE 1) in a reference subframe on a physical downlink control channel (PDCCH), that is, the base station sends a downlink grant (DL grant) to the UE 1, the UE 1 does not detect the PDCCH due to relatively poor downlink channel quality, and the UE 1 is considered to be not scheduled in the reference subframe. Therefore, the UE 1 does not send feedback information of a HARQ status for the reference subframe, and the base station finds no valid information on a corresponding HARQ resource, and may determine a HARQ status of the UE 1 as a DTX state. If that the HARQ status of the UE detected by the base station is a DTX state is caused due to the relatively poor downlink channel quality, it indicates that the base station and another interference source node such as Wi-Fi may simultaneously complete sensing and collide with each other, and the CWS needs to be increased to reduce a collision probability in a next time of transmission. However, that the HARQ status of the UE detected by the base station is a DTX state is caused due to not only the relatively poor downlink channel quality but also another factor. Therefore, if it is directly determined that the base station and the another interference source node simultaneously complete sensing and collide with each other, and the CWS is increased, a probability of incorrectly adjusting the CWS is increased.

Further, on an unlicensed spectrum, any sending node needs to perform LBT before sending information to the base station. If the LBT succeeds, the sending node can access a channel; or if the LBT fails, that is, it is sensed before scheduled uplink transmission that a channel is busy or that a value of a backoff counter is not decreased to 0, the sending node cannot access the channel. Therefore, even if the UE needs to feed back a HARQ status for the reference subframe in an uplink subframe, the UE cannot send the feedback information of a HARQ status in the uplink subframe when the UE fails to perform LBT in the uplink transmission for the uplink subframe and fails to preempt a channel. When the UE fails to perform LBT, the UE does not occupy a HARQ resource in an uplink resource. Therefore, it is determined from a perspective of the base station that the HARQ status of the UE is a DTX state. If the foregoing implementation is applied, the HARQ status of the UE is denoted as a NACK state when the HARQ status of the UE is the DTX state. As a result, channel link quality is incorrectly determined to be poor. In this case, if the CWS is adjusted based on a proportion occupied by a NACK state in a HARQ status set, the CWS is relatively large, and consequently, a waiting time of the base station is relatively long. A HARQ status included in the HARQ status set includes an ACK state and a NACK state, and the HARQ status set is used to determine the CWS of the UE.

In conclusion, it can be learned that: When the UE feeds back the HARQ status on the unlicensed spectrum, the base station cannot determine which one of the following is the reason causing that the HARQ status of the UE is a DTX state: the UE fails to perform LBT or the UE fails to detect the PDCCH, and incorrectly determines that that the HARQ status of the UE is a DTX state is caused because the UE fails to perform LBT while it is actually caused because the UE fails to detect a PDCCH. Therefore, when determining the CWS of the UE, the base station denotes the HARQ status of the UE as a NACK state. As a result, an adjusted CWS is relatively large.

The embodiments of the present invention provide a method and an apparatus for determining a CWS in CCA. Therefore, when the UE feeds back the HARQ status on the unlicensed spectrum, the base station can distinguish between a case in which that the HARQ status of the UE is a DTX state is caused because the UE fails to perform LBT and a case in which that the HARQ status of the UE is a DTX state is caused because the UE fails to detect a PDCCH. When determining the CWS in CCA, the base station considers only the case in which that the HARQ status of the UE is a DTX state is caused because the UE fails to detect a PDCCH. When determining the CWS in the CCA, the base station does not mistake, as a NACK state, a DTX state of the HARQ status of the UE when the UE fails to perform LBT, so as to improve accuracy of determining a CWS in CCA.

During specific implementation, the method and the apparatus for determining a CWS in CCA provided in the embodiments of the present invention are applicable to a wireless communications system working on the unlicensed spectrum. The base station in the wireless communications system may send downlink information on the unlicensed spectrum, and receive feedback information of a HARQ status sent by the UE on the unlicensed spectrum for the downlink information. An unlicensed carrier that carries the downlink information sent by the base station and an unlicensed carrier that carries the feedback information of the HARQ status sent by the UE may be a same carrier, or may be different carriers. That is, if the base station sends the downlink information on an unlicensed carrier A, the UE may feed back the HARQ status of the UE on the unlicensed carrier A for the downlink information on the unlicensed carrier A, or may feed back the HARQ status of the UE on an unlicensed carrier B for the downlink information on the unlicensed carrier A. This is not limited herein. If the unlicensed carrier A is a secondary carrier, the unlicensed carrier B may be a primary carrier, or may be a secondary carrier different from the unlicensed carrier A. This is not limited herein.

Figure 3:
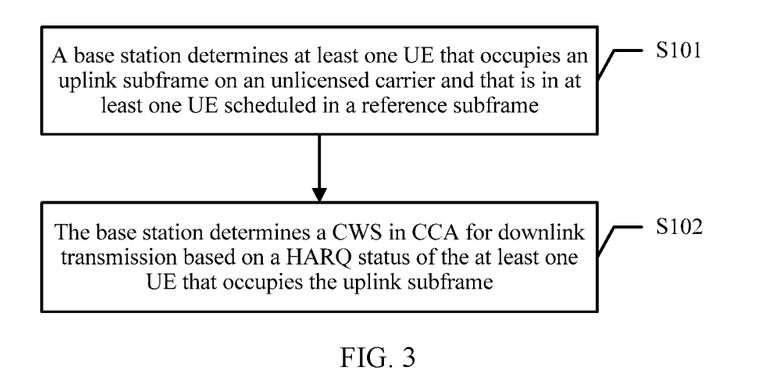
FIG. 3 is a schematic flowchart of a method for determining a contention window size in clear channel assessment according to an embodiment of the present invention.
Figure 4:
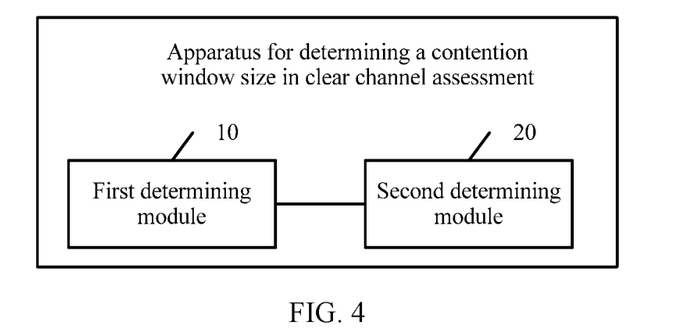
FIG. 4 is a schematic structural diagram of an apparatus for determining a contention window size in clear channel assessment according to an embodiment of the present invention.
Figure 5:
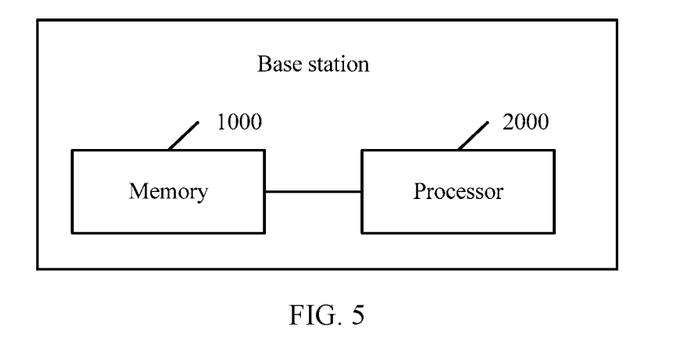
FIG. 5 is a schematic structural diagram of a base station according to an embodiment of the present invention.

During specific implementation, the base station described in the embodiments of the present invention may include a macro base station, a micro cell, a pico cell, a home eNodeB, a remote radio-frequency head, a relay, or the like. This is not limited herein. The UE described in the embodiments of the present invention may include a mobile phone, a notebook computer or a tablet computer that can access an LTE system, or the like. This is not limited herein. With reference to FIG. 3 to FIG. 5, the following describes in detail the method and the apparatus for determining a CWS in CCA provided in the embodiments of the present invention.

Referring to FIG. 3, FIG. 3 is a schematic flowchart of a method for determining a CWS in CCA according to an embodiment of the present invention. The method provided in this embodiment of the present invention includes the following steps.

S101. A base station determines at least one UE that occupies an uplink subframe on an unlicensed carrier and that is in at least one UE scheduled in a reference subframe.

S102. The base station determines a CWS in CCA for downlink transmission based on a HARQ status of the at least one UE that occupies the uplink subframe.

It should be noted that the base station determines the CWS in the CCA for the downlink transmission based on the HARQ status of the at least one UE that occupies the uplink subframe, that is, when the base station determines the CWS in the CCA for the downlink transmission, the base station ignores a HARQ status corresponding to UE that does not occupy the uplink subframe.

Therefore, step S102 includes:

determining, by the base station, the CWS in the CCA for the downlink transmission based on the HARQ status of the at least one UE that occupies the uplink subframe, where a HARQ status of UE that does not occupy the uplink subframe on the unlicensed carrier and that is scheduled by the base station in the reference subframe is not used as a factor of determining the CWS in the CCA for the downlink transmission; or determining, by the base station, the CWS in the CCA for the downlink transmission based on the HARQ status of the at least one UE that occupies the uplink subframe, and ignoring a HARQ status of UE that does not occupy the uplink subframe on the unlicensed carrier and that is scheduled by the base station in the reference subframe when determining the CWS in the CCA for the downlink transmission.

The base station determines, based on the HARQ status, whether the UE scheduled in a downlink subframe correctly receives the downlink subframe. The UE reports, to the base station by using a HARQ status feedback, whether the UE correctly receives the downlink subframe. The HARQ status detected by the base station includes three states such as an ACK state, a NACK state, and a DTX state. The ACK state is a feedback indicating that the UE correctly receives the downlink subframe. The NACK state is a feedback indicating that the UE incorrectly receives the downlink subframe. If the base station finds, on a corresponding HARQ resource, no HARQ status feedback sent by the UE, the HARQ status is a DTX state.

In an LTE system, there is a fixed time between each downlink subframe and an uplink subframe occupied by the UE to feed back a HARQ status indicating whether the downlink subframe is correctly received. For example, in a frequency division duplex (FDD) mode, a HARQ status corresponding to each downlink subframe (which is assumed as an $n^{th}$ subframe) is fed back in an uplink subframe (an $(n+4)^{th}$ subframe).

The base station may schedule at least one UE in the reference subframe, in other words, the base station may schedule one or more UEs in the reference subframe. In this embodiment of the present invention, the base station may first determine one or more UEs (in other words, at least one UE) that occupy an uplink subframe on an unlicensed spectrum and that are in the one or more UEs scheduled in the reference subframe. That the base station schedules at least one UE in the reference subframe means that the base station allocates a downlink resource in the reference subframe to the at least one UE. The uplink subframe is an uplink subframe in which the UE (there may be one or more UEs, and one of the one or more UEs is used as an example for description in the following and is assumed as UE 1) scheduled by the base station in the reference subframe feeds back a HARQ status for the reference subframe. It should be noted that there may be one or more uplink subframes that are on the unlicensed spectrum and that are occupied by the at least one UE, that is, the at least one UE may feed back a HARQ status for the reference subframe in a same uplink subframe, or may feed back a HARQ status for the reference subframe in different uplink subframes. However, each UE feeds back a HARQ status in only one uplink subframe, and each UE in the at least one UE that occupies the uplink subframe on the unlicensed carrier occupies an uplink subframe corresponding to the UE. That the UE feeds back a HARQ status for the reference subframe in the uplink subframe includes that the UE feeds back a HARQ status only for the reference subframe, and that the UE performs a feedback for a plurality of downlink subframes including the reference subframe. If the UE feeds back a plurality of HARQ statuses for a plurality of downlink subframes in an uplink subframe, when determining the CWS, the base station selects only a HARQ status that is of the UE and that corresponds to the reference subframe.

It should be noted that the base station determines the CWS in the CCA for the downlink transmission based on the HARQ status of the at least one UE that occupies the uplink subframe. Each UE in the at least one UE scheduled in the reference subframe may perform a feedback on the unlicensed carrier; or some UEs perform a feedback on the unlicensed carrier, and some UEs perform feedback on a licensed carrier. When the base station determines the CWS in the CCA for the downlink transmission based on the HARQ status of the at least one UE that occupies the uplink subframe, if each UE in the UE scheduled in the reference subframe performs a feedback on the unlicensed carrier, the base station determines the CWS based on a HARQ status of UE that occupies an uplink subframe corresponding to the reference subframe; or if some UEs in the UE scheduled in the reference subframe perform a feedback on the unlicensed carrier, and some UEs perform a feedback on the licensed carrier, the base station determines the CWS based on a HARQ status that is of the UE that occupies the uplink subframe on the unlicensed carrier and that is fed back on the unlicensed carrier and a HARQ status that is of UE and that is fed back on the licensed carrier.

In some feasible implementations, if the base station finds that the UE scheduled in the reference subframe occupies a HARQ resource in the uplink subframe to feed back a HARQ status, the base station determines that the UE that occupies the HARQ resource in the uplink subframe to feed back the HARQ status occupies the uplink subframe. Each UE may feed back a HARQ status for the reference subframe or the plurality of downlink subframes including the reference subframe. The uplink subframe includes an uplink subframe in which one UE feeds back a HARQ status for the reference subframe or the plurality of downlink subframes including the reference subframe, or an uplink subframe in which a plurality of UEs feed back HARQ statuses for the reference subframe or the plurality of downlink subframes including the reference subframe, in other words, the plurality of UEs occupy the same uplink subframe.

It should be noted that in some feasible implementations, the base station determines the CWS in the CCA for the downlink transmission based on only the HARQ status of the UE that occupies the HARQ resource in the uplink subframe to feed back a HARQ status. That is, in HARQ statuses of all UEs, the base station ignores a HARQ status of UE that does not occupy the HARQ resource in the uplink subframe to feed back a HARQ status. The HARQ resource is a physical layer resource that is in the uplink subframe and that is used to carry a state indicating correct receiving or a state indicating incorrect receiving that is fed back by the UE for at least one downlink subframe. The HARQ resource may be specifically carried on a PUCCH, or may be carried on a PUSCH. The physical layer resource includes: a time and frequency domain resource, a time and frequency resource and a code domain resource, or the like. This is not limited herein. A HARQ resource carried on the PUSCH is presented as the time and frequency domain resource, and a HARQ resource carried on the PUCCH is presented as the time and frequency domain resource or the code domain resource.

It should be noted that, that the UE occupies the HARQ resource in the uplink subframe includes that the UE sends a HARQ status feedback on a corresponding HARQ resource, or that the UE does not feed back a HARQ status on a corresponding HARQ resource. The HARQ status feedback is a response of the UE indicating whether the reference subframe is correctly received. That the UE sends a HARQ status feedback on the corresponding HARQ resource includes that the UE feeds back a HARQ status for the reference subframe on the HARQ resource in the uplink subframe, or that the UE feeds back HARQ statuses for the plurality of downlink subframes including the reference subframe on the HARQ resource in the uplink subframe. When feedback is performed only for the reference subframe in the uplink subframe, the HARQ status includes the ACK state or the NACK state. When feedback is performed for the plurality of downlink subframes including the reference subframe in the uplink subframe, a HARQ status includes multi-bit or jointly-coded ACK, NACK, or DTX information. When the UE occupies the HARQ resource but does not feed back the HARQ status, the base station still finds no feedback information of the HARQ status. For example, when the HARQ resource is carried on the PUSCH, the UE needs to perform puncturing on some PUSCH resources, that is, some resource elements (RE) in an uplink resource corresponding to the PUSCH are used as HARQ resources to carry HARQ status feedback information. However, it is possible that the UE does not detect the PDCCH and does not perform puncturing on a resource corresponding to a HARQ on the PUSCH, and still transmits data information. In this case, the base station still performs detection for a HARQ status on the HARQ resource and obtains no valid information, and therefore, cannot determine whether the UE occupies the uplink subframe. The base station merely determines that the UE that occupies the HARQ resource in the uplink subframe to feed back the HARQ status occupies the uplink subframe.

It should be noted that when the base station finds that the UE scheduled in the reference subframe occupies the HARQ resource in the uplink subframe to feed back the HARQ status, the base station only needs to determine that the UE sends valid feedback information of the HARQ status, and does not need to obtain a specific ACK/NACK/DTX state. For example, a HARQ status that is for the reference subframe and that is fed back by the UE on the HARQ resource in the uplink subframe is an ACK/NACK state, and the base station does not need to first determine whether the HARQ status is specifically the ACK state or the NACK state when determining that the UE occupies the uplink subframe. Alternatively, in a time division duplex ( ) mode, the UE feeds back multi-bit or jointly-coded HARQ status information such as ACK/NACK/DTX on a HARQ resource in one uplink subframe for more than one downlink subframes, and the base station merely needs to know that the UE sends the information and does not need to determine in advance what state the reference subframe is in the three states. When determining the CWS, the base station needs to determine a HARQ status set with reference to a specific HARQ status feedback. In this embodiment of the present invention, if the base station finds that the UE occupies the HARQ resource in the uplink subframe to feed back the HARQ status, and obtains a valid HARQ status such as ACK/NACK through demodulation, the ACK state or the NACK state that may be obtained through demodulation may be added into the HARQ status set in the reference subframe. The HARQ status set includes all HARQ statuses that can be obtained for the reference subframe and that are collected by the base station to determine the CWS. If the base station finds that the UE occupies the HARQ resource in the uplink subframe to feed back the HARQ status, and obtains a valid multi-bit or jointly-coded HARQ status such as ACK/NACK/DTX through demodulation, the ACK state or the NACK state that may be obtained through demodulation may be added into the HARQ status set in the reference subframe; or if a detected HARQ status corresponding to the reference subframe is the DTX state, the HARQ status is denoted as the NACK state and is added into the HARQ status set when the CWS is determined.

The UE does not occupy the HARQ resource in the uplink subframe to feed back the HARQ status, and this may be because the UE fails to perform LBT or the UE fails to detect a PDCCH. If the UE fails to detect the PDCCH, the UE does not send information on the HARQ resource in the uplink subframe corresponding to the UE. For example, when the UE does not detect the PDCCH in the reference subframe, the UE does not send information on the HARQ resource in the uplink subframe corresponding to the reference subframe. Alternatively, when the UE needs to feed back a HARQ status for more than one downlink subframes in one uplink subframe, and the UE does not detect a PDCCH in each downlink subframe in the plurality of downlink subframes including the reference subframe, the UE does not send the HARQ information on HARQ resources in uplink subframes corresponding to the plurality of downlink subframes including the reference subframe. That is, if the UE does not occupy the HARQ resource in the uplink subframe, the base station finds that there is no valid information on the HARQ resource, or the base station cannot obtain a valid HARQ status such as ACK/NACK through demodulation (in this case, the base station determines a HARQ status of the UE as a DTX state), or the base station cannot obtain the valid multi-bit or jointly-coded HARQ status such as ACK/NACK/DTX through demodulation.

That the UE does not occupy the HARQ resource in the uplink subframe to feed back the HARQ status may be caused because the UE fails to perform LBT or because the UE fails to detect a PDCCH. Based on an implementation in the prior art, the base station determines that, that the UE does not occupy the HARQ resource in the uplink subframe to feed back the HARQ status is caused because the UE fails to detect the PDCCH, determines a HARQ status of the UE as a DTX state, denotes the DTX state as a NACK state, and adds the HARQ status into the HARQ status set. In this case, if that the UE does not occupy the HARQ resource in the uplink subframe to feed back the HARQ status is caused because the UE fails to perform LBT, channel link quality is incorrectly reflected to be poor based on the implementation in the prior art.

In some feasible implementations, when the UE does not occupy the HARQ resource in the uplink subframe to feed back the HARQ status, the base station in this embodiment of the present invention may determine the HARQ status of the UE as a DTX state caused because LBT fails, ignores the DTX state of the UE, and does not add the DTX state of the UE into the HARQ status set in the reference subframe. In a small cell environment to which LAA is well applied, because the small cell is densely arranged, a probability that the UE cannot preempt a channel on the unlicensed spectrum (that is, the UE fails to perform LBT) is far greater than a probability that PDCCH detection fails. Therefore, the base station determines that the DTX state is caused because LBT fails, and ignores the DTX state, so as to more approximately reflect an impact of actual link quality on a CWS. Although an uplink subframe with a DTX state may actually be caused because the UE does not detect the PDCCH, a standardization impact of the method in which a DTX state is ignored is relatively small, and a detection complexity requirement for the base station is relatively low.

In some feasible implementations, if the base station finds that the UE scheduled in the reference subframe does not occupy the HARQ resource in the uplink subframe to feed back the HARQ status, the base station may directly determine the HARQ status of the UE as the DTX state caused because LBT fails, ignore the HARQ status of the UE, and not add the HARQ status of the UE into the HARQ status set. In addition, when detecting that the UE scheduled in the reference subframe does not occupy the HARQ resource in the uplink subframe to feed back the HARQ status, the base station may further determine whether that the UE does not occupy the HARQ resource in the uplink subframe to feed back the HARQ status is caused because LBT fails, that is, the base station may further determine whether the UE occupies the uplink subframe on the unlicensed carrier. During specific implementation, if the base station finds that one or more UEs (one UE in the one or more UEs is used as an example for description in the following, and is assumed as UE 1) in a plurality of UEs scheduled in the reference subframe do not occupy the HARQ resource in the uplink subframe to feed back a HARQ status, and finds that the UE 1 that does not occupy the HARQ resource in the uplink subframe to feed back the HARQ status occupies an uplink resource other than the HARQ resource in the uplink subframe, the base station may determine that the UE 1 that occupies the uplink resource other than the HARQ resource in the uplink subframe occupies the uplink subframe. If the base station determines that the UE 1 that does not occupy the HARQ resource in the uplink subframe to feed back the HARQ status occupies the uplink resource other than the HARQ resource in the uplink subframe, it can be determined that that no valid information is detected on the HARQ resource is not caused because the UE fails to perform LBT, but is caused because the UE fails to detect a PDCCH. In this case, the base station may determine the HARQ status of the UE as the DTX state, denote the HARQ status of the UE as the NACK state, and add the HARQ status into the HARQ status set. That is, in the foregoing scenario, the base station determines the HARQ status of the UE as the DTX state, and does not ignore the DTX state but denotes the HARQ status of the UE as the NACK state when determining the CWS.

It should be noted that a detection manner in which the base station finds that the UE (for example, the UE 1, and the UE 1 is used as an example for description in the following) that does not occupy the HARQ resource in the uplink subframe to send the HARQ status occupies the uplink resource other than the HARQ resource in the uplink subframe may include any one or more of the following three implementations.

Implementation 1

If the base station finds that the UE 1 that does not occupy the HARQ resource in the uplink subframe to feed back the HARQ status sends a demodulation reference signal (DMRS), the base station determines that the UE 1 occupies the uplink resource other than the HARQ resource in the uplink subframe.

That is, if the base station finds that the UE 1 does not occupy the HARQ resource in the uplink subframe to feed back the HARQ status, and finds the DMRS sent by the UE 1, it can be determined that that the UE does not occupy the uplink subframe is not caused because the UE fails to perform LBT, but is caused because the UE fails to detect a PDCCH. In this case, the base station may determine a HARQ status of the UE as the DTX state; and when determining a CWS of the UE, denote the HARQ status of the UE as the NACK state, and add the HARQ status into the HARQ status set.

Implementation 2

If the base station finds that the UE 1 that does not occupy the HARQ resource in the uplink subframe to feed back the HARQ status sends uplink service information on a PUSCH, the base station determines that the UE 1 occupies the uplink resource other than the HARQ resource in the uplink subframe.

That is, if the base station finds that the UE 1 does not occupy the HARQ resource in the uplink subframe to feed back the HARQ status, and finds that the UE 1 sends the uplink service information on the PUSCH, it can be determined that that the UE does not occupy the uplink subframe is not caused because the UE fails to perform LBT, but is caused because the UE fails to detect the PDCCH. In this case, the base station may determine the HARQ status of the UE as the DTX state; and when determining the CWS of the UE, denote the HARQ status of the UE as the NACK state, and add the HARQ status into the HARQ status set.

Implementation 3

If the base station finds that the UE 1 that does not occupy the HARQ resource in the uplink subframe to feed back the HARQ status sends uplink control information on a PUCCH, the base station determines that the UE 1 occupies the uplink resource other than the HARQ resource in the uplink subframe.

That is, if the base station finds that the UE 1 does not occupy the HARQ resource in the uplink subframe to feed back the HARQ status, and finds that the UE 1 sends uplink control information on the PUCCH, it can be determined that that the UE does not occupy the uplink subframe is not caused because the UE fails to perform LBT, but is caused because the UE fails to detect the PDCCH. In this case, the base station may determine the HARQ status of the UE as the DTX state; and when determining the CWS of the UE, denote the HARQ status of the UE as the NACK state, and add the HARQ status into the HARQ status set. The uplink control information sent by the UE 1 on the PUCCH includes a scheduling request (SR) or channel state information (CSI).

Further, it should be noted that two branches are included when the base station determines, based on whether the uplink resource other than the HARQ resource in the uplink subframe is occupied by the UE, whether the DTX state is caused because LBT fails. Branch 1: Detect whether the UE occupies a PUCCH in the uplink subframe of the HARQ resource. Branch 2: Detect whether the UE occupies a PUSCH in the uplink subframe of the HARQ resource.

Branch 1: The UE Feeds Back the HARQ Status on the PUCCH.

The HARQ resource on the PUCCH is indicated by a DL grant indication of the PDCCH, or is obtained through mapping and calculation based on a resource of a DL grant. Therefore, when receiving no DL grant, the UE does not feed back the HARQ status. In this case, the HARQ status corresponding to the UE is the DTX state. However, there is other UCI information periodically sent on the PUCCH, including SR and/or CSI. The base station may configure the HARQ status feedback and the SR and/or CSI to multiplex the PUCCH. The SR and the CSI are configured to be periodic. The UE sends the SR and the CSI on a corresponding PUCCH resource periodically regardless of whether the DL grant is received.

In correspondence with Case 1, the HARQ status feedback and other UCI information do not multiplex the PUCCH, and the UE feeds back only the HARQ status on the PUCCH.

When only the HARQ status corresponding to the UE needs to be fed back in the uplink subframe, and the SR and/or the CSI do/does not need to be sent, the base station still cannot determine a reason causing the DTX state. In this case, the HARQ status set used by the base station to determine the CWS falls back to an ACK state or a NACK state included in the HARQ status that corresponds to the UE and that is detected by the base station. If the base station does not detect valid information on the HARQ resource, in other words, the HARQ status is the DTX state, the DTX state is ignored when the CWS is determined.

In correspondence with Case 2, the UE feeds back the HARQ status and other UCI information such as the SR and/or the CSI on the PUCCH.

When the PUCCH in the uplink subframe carries the HARQ resource, and the HARQ status feedback and the SR and/or the CSI multiplex the PUCCH, a manner in which the base station determines the HARQ status set used for CWS adjustment includes: 1. The base station finds that the UE occupies the HARQ resource in the uplink subframe used in the feedback for the reference subframe, to feed back the HARQ status; and 2. The base station finds that the UE does not occupy the HARQ resource in the uplink subframe used in a feedback for the reference subframe, to feed back the HARQ status, and finds that the UE occupies another UCI resource on the same PUCCH, namely, a PUCCH resource corresponding to the SR and/or the CSI. The base station may determine, by detecting existence of the SR or the CSI, whether the UE occupies the uplink subframe, so as to determine whether that the HARQ status corresponding to the UE is the DTX state is caused because LBT fails. If the UE occupies the another UCI resource, the base station excludes a probability that the LBT fails; and when determining the CWS of the UE, denotes, as the NACK state, the HARQ status corresponding to the UE, and adds the HARQ status into the HARQ status set. If the UE does not occupy any other UCI resource, in other words, the base station finds no valid information on the PUCCH, the DTX state may be caused because the LBT fails, and the base station ignores the DTX state. Certainly, in the latter case, LBT may succeed, and the base station finds no PUCCH due to a poor uplink channel quality. However, because the base station cannot determine the reason causing the DTX state, and a probability that the LBT fails is far greater than a probability that PUCCH detection fails, the CWS may be more accurately determined by ignoring the DTX state when no other UCI is detected.

Branch 2: The UE Feeds Back the HARQ Status on the PUSCH.

If the HARQ status is carried on the PUSCH, the base station performs puncturing on a data resource of the PUSCH for bit information of the HARQ status corresponding to the UE. Therefore, if the UE finds a DL grant and demodulates the PDCCH, the HARQ resource obtained after the puncturing performed on the PUSCH is filled with HARQ status information; or if the UE does not detect a DL grant, the UE does not send the feedback information of the HARQ status on a resource corresponding to the HARQ status. It should be noted that it is possible during actual application that the UE loses the DL grant but does not lose an uplink grant (UL grant). For example, the base station sends the DL grant and the UL grant respectively in two different downlink subframes, and feeds back, based on a HARQ time sequence such as a time sequence in a TDD frame structure, a HARQ corresponding to a downlink subframe of DL grant in an uplink subframe scheduled in UL grant. The UE fails to receive a downlink subframe corresponding to the DL grant, but successfully receives a downlink subframe corresponding to the UL grant. Therefore, the base station cannot directly determine, based on the DTX state corresponding to the HARQ resource, whether the DTX state is caused because LBT fails or because PDCCH detection fails. However, if the base station sends other data information on the PUSCH of the HARQ resource, it may also indicate that the UE occupies the uplink subframe. Therefore, in some feasible implementations, the base station demodulates the PUSCH of the UE; and when determining the CWS of the UE, denotes, as the NACK state, the HARQ status that is of the UE and that corresponds to an uplink subframe in which a correctly-demodulated PUSCH is located, and ignores the HARQ status that is of the UE and that corresponds to an uplink subframe in which an incorrectly-demodulated PUSCH is located.

In addition, the DMRS and the PUSCH data information are sent in a same uplink subframe, and the base station may further determine, by detecting existence of an uplink DMRS, whether the UE occupies the uplink resource other than the HARQ resource in an uplink subframe. If the DMRS is detected, it indicates that the UE preempts a channel and sends the PUSCH data information. Because the DMRS is a code sequence, if a peak value on a symbol corresponding to the DMRS is detected through detection related to the sequence, it may be determined that the UE sends the DMRS. Even if the PUSCH is not correctly demodulated due to poor channel quality, it may be determined that the UE occupies the uplink subframe. In comparison with the detection on existence of a PUSCH data resource, the detection on existence of a DMRS can enable the PUSCH to be detected when quality of an uplink channel is poorer. Therefore, when the HARQ resource is carried on the PUSCH, a manner in which the base station determines the HARQ status set used for CWS adjustment includes: 1. The base station finds that the UE occupies the HARQ resource in the uplink subframe used in the feedback for the reference subframe, to feed back the HARQ status; and 2. The base station finds that the UE does not occupy the HARQ resource in the uplink subframe used in the feedback for the reference subframe, to feed back the HARQ status, and finds that the UE occupies a data resource or a DMRS resource on the PUCCH in a same uplink subframe.

It should be noted that the base station may determine, by detecting only whether the UE occupies the HARQ resource in the uplink subframe used in the HARQ status feedback for the reference subframe, whether the UE successfully performs LBT in the uplink subframe, so as to determine the CWS. When the HARQ resource in the uplink subframe is carried on the PUCCH, when determining the CWS, the base station considers only the HARQ status corresponding to the UE that occupies the HARQ resource on the PUCCH used in the feedback for the reference subframe, and ignores the HARQ status of the UE that does not occupy the HARQ resource on the PUCCH.

It should be noted that the base station may also determine, in the following two manners, whether the UE successfully performs LBT in the uplink subframe: 1. Detect whether the UE occupies the HARQ resource in the uplink subframe used in the feedback for the reference subframe to feed back the HARQ status; or 2. Detect whether the UE occupies the uplink resource other than the HARQ resource in the uplink subframe used in the feedback for the reference subframe. It indicates that the UE occupies the uplink subframe, in other words, LBT succeeds in the uplink subframe when any one of the following cases is detected: The UE occupies the HARQ resource in the uplink subframe used in the HARQ status feedback for the reference subframe; or the UE occupies the uplink resource other than the HARQ resource in the uplink subframe used in the HARQ status feedback for the reference subframe. For example, when the HARQ resource is carried on the PUCCH, when the base station determines the CWS, if the base station finds that the UE occupies the HARQ resource on the PUCCH to feed back the HARQ status, or finds that the UE does not occupy the HARQ resource on the PUCCH and finds that the UE sends other UCI information on the same PUCCH, the base station denotes, as the NACK state, the DTX state corresponding to the UE, and adds the HARQ status into the HARQ status set, to determine the CWS. Alternatively, when the HARQ resource is carried on the PUSCH, when the base station determines the CWS, if the base station finds that the UE occupies the HARQ resource on the PUSCH to feed back the HARQ status, or finds that the UE does not occupy the HARQ resource on the PUSCH and finds that the UE sends the data information or the DMRS on the same PUSCH, the base station denotes, as the NACK state, the DTX state corresponding to the UE, and adds the HARQ status into the HARQ status set, to determine the CWS.

It should be noted that for Branch 1 and Branch 2, different base stations have different requirements for whether simultaneous transmission of a PUCCH and a PUSCH of same UE is allowed in a same uplink subframe. Therefore, for a base station that does not indicate that simultaneous transmission of the PUCCH and the PUSCH of the same UE is allowed in the same uplink subframe, if the HARQ resource is carried on the PUCCH in the uplink subframe, the base station finds only whether the PUCCH is occupied by the UE; or if the HARQ resource is carried on the PUSCH in the uplink subframe, the base station finds only whether the PUSCH channel is occupied by the UE. For a base station that indicates that simultaneous transmission of the PUCCH and the PUSCH of the same UE is allowed in the same uplink subframe, regardless of whether the HARQ resource is carried on the PUCCH in the uplink subframe or is carried on the PUSCH in the uplink subframe, the base station may determine, by detecting whether any one of the PUCCH or the PUSCH is occupied by the UE, whether LBT fails. For example, when the HARQ resource is carried on the PUCCH, and the base station finds that the UE occupies the PUSCH channel to send the data information or the DMRS, it can be determined that LBT succeeds. When determining the CWS of the UE, the base station denotes the corresponding DTX state on the PUCCH as the NACK state, and adds the HARQ status into the HARQ status set.

In some feasible implementations, if the base station finds that UE scheduled in the reference subframe does not occupy the HARQ resource in the uplink subframe to feed back the HARQ status, the base station may directly determine the HARQ status of the UE as the DTX state caused because the LBT fails; and when determining the CWS of the UE, ignore the HARQ status of the UE, and not add the HARQ status of the UE into the HARQ status set. In addition, when detecting that the UE scheduled in the reference subframe does not occupy the HARQ resource in the uplink subframe to feed back the HARQ status, the base station may further determine whether that the UE does not occupy the HARQ resource in the uplink subframe is caused because the LBT fails, that is, the base station may further determine whether the UE occupies the uplink subframe on the unlicensed carrier.

During actual application, a probability that the UE successfully performs LBT is further related to an uplink sensing parameter such as a CWS or an initial value of a backoff counter generated based on a CWS. A larger CWS or a larger initial value of the backoff counter generated based on the CWS indicates a longer waiting time of the UE before accessing a channel and a lower probability of accessing a channel in a scheduled uplink subframe. On the contrary, a smaller CWS or a smaller initial value of the backoff counter indicates a higher probability of accessing a channel. Therefore, when the base station determines that the HARQ status corresponding to the UE is the DTX state (that is, the base station finds that the UE scheduled in the reference subframe does not occupy the HARQ resource in the uplink subframe), or finds that the UE does not occupy the HARQ resource in the uplink subframe to feed back the HARQ status and finds that the PUCCH and the PUSCH are not occupied by the UE, when the CWS or the initial value of the backoff counter is relatively large, a probability that that the HARQ status corresponding to the UE is the DTX state is caused because LBT fails is greater than a probability that that the HARQ status is the DTX state is caused because PDCCH detection fails. In this case, the base station may determine that the DTX state is caused because the LBT fails, and ignore the DTX state. Conversely, a smaller CWS or a smaller initial value of the backoff counter indicates a lower probability that that the HARQ status corresponding to the UE is the DTX state is caused because LBT fails. In this case, the base station may determine that that the HARQ status corresponding to the UE is the DTX state is caused because PDCCH detection fails, denote the DTX state as the NACK state, and add the NACK state into the HARQ status set. It should be noted that the base station may generate the CWS of the UE in uplink LBT and notify the UE of the CWS; and then the UE generates the initial value of the backoff counter based on the CWS; or the base station directly generates the initial value of the backoff counter and notifies the UE of the initial value. Therefore, the base station knows the CWS of the UE or the initial value of the backoff counter, and may determine, based on one of the parameters, a reason causing the DTX state.

During specific implementation, if the base station finds that the one or more UEs (one UE in the one or more UEs is used as an example for description in the following, and is assumed as UE 1) in the plurality of UEs scheduled in the reference subframe do not occupy the HARQ resource in the uplink subframe to feed back the HARQ status, and the CWS in the CCA performed by the UE 1 for the uplink subframe is not greater than a first preset threshold, or the initial value of the backoff counter generated based on CWS performed by the at least one UE for the uplink subframe is not greater than a second preset threshold, it is determined that the UE 1 occupies the uplink subframe. When determining the CWS of the UE, the base station may denote the HARQ status of the UE 1 as the NACK state, and add the HARQ status into the HARQ status set. Alternatively, if the base station determines that the UE 1 does not occupy the HARQ resource in the uplink subframe to feed back the HARQ status, and does not occupy the uplink resource other than the HARQ resource in the uplink subframe, and the CWS in the CCA performed by the UE 1 for the uplink subframe is not greater than a first preset threshold, or the initial value of the backoff counter generated based on CWS performed by the at least one UE for the uplink subframe is not greater than a second preset threshold, it is determined that the UE 1 occupies the uplink subframe. When determining the CWS of the UE, the base station may denote the HARQ status of the UE 1 as the NACK state, and add the HARQ status into the HARQ status set.

Further, when the base station determines whether that the HARQ status corresponding to the UE is the DTX state is caused because the LBT fails, the determining may be performed based on whether the uplink resource other than the HARQ resource is occupied by the UE, and may also be performed based on report information sent by the UE. The report information sent by the UE to the base station is used to notify the base station whether the UE occupies the uplink subframe. The UE directly reports, to the base station, a message indicating LBT success or LBT failure in the uplink subframe. The report information may be carried in the uplink subframe occupied by the UE, and is used to notify the base station of index of an uplink subframe that is not occupied because the LBT fails. If the base station finds that the uplink subframe in which the HARQ status corresponding to the UE is the DTX state is the subframe in which the UE reports the LBT failure, when determining the CWS, the base station ignores the HARQ status of the UE, that is, the DTX state, and does not add the HARQ status of the UE into the HARQ status set. That is, if the base station finds that the UE 1 sends the report information, the base station may directly determine, based on the report information, whether the UE 1 occupies the uplink subframe. If the base station determines, based on the report information sent by the UE 1, that the UE 1 does not occupy the uplink subframe, when determining the CWS, the base station ignores the HARQ status of the UE. If the base station determines, based on the report information sent by the UE 1, that the UE 1 occupies the uplink subframe, when determining the CWS, the base station denotes the HARQ status of the UE as the NACK state.

During specific implementation, after determining the HARQ status of the UE that occupies the uplink subframe, when determining the CWS in the CCA for the downlink transmission, the base station may determine the CWS in the CCA based on a quantity of NACK states included in the HARQ status set used for determining the CWS and based on a ratio of the quantity of NACK states to a total quantity of all HARQ statuses included in the HARQ status set. Specifically, when the ratio of the quantity of NACK states to the total quantity of all HARQ statuses included in the HARQ status set exceeds a preset threshold (for example, 80%), the CWS is increased; otherwise, a CWS is decreased. The quantity of NACK states includes a quantity of DTX states that are denoted as NACK states.

In this embodiment of the present invention, the base station may determine, by using a plurality of implementations, the one or more UEs that occupy the uplink subframe on the unlicensed carrier and that are in the plurality of UEs scheduled in the reference subframe, and determine the CWS in the CCA for the downlink transmission based on a HARQ status of each UE that occupies the uplink subframe. The base station can determine whether that the HARQ status of the UE is the DTX state is caused because the LBT fails or because the PDCCH detection fails; ignore the DTX state caused because the LBT fails; and denote, as the NACK state, the DTX state caused because the PDCCH detection fails, and add the NACK state into the HARQ status set for determining the CWS, so as to improve accuracy of determining the CWS for the downlink transmission, and reduce a probability of increasing a waiting time of the base station due to an adjusted excessively large CWS.

Referring to FIG. 4, FIG. 4 is a schematic structural diagram of an apparatus for determining a contention window size in clear channel assessment according to an embodiment of the present invention. The apparatus described in this embodiment of the present invention includes:

a first determining module 10, configured to: determine at least one user equipment UE that occupies an uplink subframe on an unlicensed carrier and that is in at least one UE scheduled by a base station in a reference subframe, where the uplink subframe is an uplink subframe in which at least one UE scheduled by the base station in the reference subframe feeds back a hybrid automatic repeat request HARQ status for the reference subframe; and a second determining module 20, configured to determine a contention window size CWS in clear channel assessment CCA for downlink transmission based on a HARQ status of the at least one UE that occupies the uplink subframe.

The second determining module 20 is specifically configured to:

determine the CWS in the CCA for the downlink transmission based on the HARQ status of the at least one UE that occupies the uplink subframe, where a HARQ status of UE that does not occupy the uplink subframe on the unlicensed carrier and that is scheduled by the base station in the reference subframe is not used as a factor of determining the CWS in the CCA for the downlink transmission; or determine the CWS in the CCA for the downlink transmission based on the HARQ status of the at least one UE that occupies the uplink subframe, and ignore a HARQ status of UE that does not occupy the uplink subframe on the unlicensed carrier and that is scheduled by the base station in the reference subframe when determining the CWS in the CCA for the downlink transmission.

In some feasible implementations, the first determining module 10 is specifically configured to:

if it is detected that at least one UE scheduled by the base station in the reference subframe does not occupy a HARQ resource in the uplink subframe to feed back a HARQ status, and that the at least one UE that does not occupy the HARQ resource in the uplink subframe to feed back the HARQ status occupies an uplink resource other than the HARQ resource in the uplink subframe, determine that the at least one UE that occupies the uplink resource other than the HARQ resource in the uplink subframe occupies the uplink subframe, where the HARQ resource is a physical layer resource carrying the HARQ status fed back by the UE.

In some feasible implementations, the first determining module 10 is specifically configured to:

if it is detected that the UE that does not occupy the HARQ resource in the uplink subframe to feed back the HARQ status sends a demodulation reference signal DMRS, determine that the UE occupies the uplink resource other than the HARQ resource in the uplink subframe;

if it is detected that the UE that does not occupy the HARQ resource in the uplink subframe to feed back the HARQ status sends uplink service information on a physical uplink shared channel PUSCH, determine that the UE occupies the uplink resource other than the HARQ resource in the uplink subframe; or if it is detected that the UE that does not occupy the HARQ resource in the uplink subframe to feed back the HARQ status sends uplink control information on a physical uplink control channel PUCCH, determine that the UE occupies the uplink resource other than the HARQ resource in the uplink subframe.

In some feasible implementations, the detected uplink control information sent on the PUCCH by the UE that does not occupy the HARQ resource in the uplink subframe to feed back the HARQ status includes: a scheduling request SR and/or channel state information CSI.

In some feasible implementations, the first determining module 10 is specifically configured to:

determine that the at least one UE occupies the uplink subframe, if it is detected that at least one UE scheduled by the base station in the reference subframe does not occupy a HARQ resource in the uplink subframe to feed back a HARQ status, and a CWS in CCA performed by the at least one UE for the uplink subframe is not greater than a first preset threshold, or an initial value of a backoff counter generated based on CWS performed by the at least one UE for the uplink subframe is not greater than a second preset threshold, where the HARQ resource is a physical layer resource carrying the HARQ status fed back by the UE.

In some feasible implementations, the first determining module 10 is specifically configured to:

determine that the at least one UE occupies the uplink subframe, if it is detected that at least one UE scheduled by the base station in the reference subframe does not occupy the HARQ resource in the uplink subframe to feed back the HARQ status and does not occupy the uplink resource other than the HARQ resource, and a CWS in CCA performed by the at least one UE for the uplink subframe is not greater than a first preset threshold, or an initial value of a backoff counter generated based on CWS performed by the at least one UE for the uplink subframe is not greater than a second preset threshold.

In some feasible implementations, the first determining module 10 is specifically configured to:

receive report information sent by at least one UE scheduled in the reference subframe, where the report information is used to indicate that the at least one UE occupies the uplink subframe; and determine that the at least one UE occupies the uplink subframe.

During specific implementation, the apparatus for determining a contention window size in clear channel assessment may be specifically the base station described in this embodiment of the present invention, and may be configured to execute the implementation described in the embodiment of the method for determining a contention window size in clear channel assessment provided in the embodiments of the present invention. For details, refer to the implementation described in each step in the method embodiment, and details are not described herein again.

In this embodiment of the present invention, the base station may determine, by using a plurality of implementations, one or more UEs that occupy the uplink subframe on the unlicensed carrier and that are in a plurality of UEs scheduled in the reference subframe, and determine the CWS in the CCA for the downlink transmission based on a HARQ status of each UE that occupies the uplink subframe. The base station can determine whether that the HARQ status of the UE is the DTX state is caused because the LBT fails or because the PDCCH detection fails; ignore the DTX state caused because the LBT fails; and denote, as the NACK state, the DTX state caused because the PDCCH detection fails, and add the NACK state into the HARQ status set for determining the CWS, so as to improve accuracy of determining the CWS for the downlink transmission, and reduce a probability of increasing a waiting time of the base station due to an adjusted excessively large CWS.

Referring to FIG. 5, FIG. 5 is a schematic structural diagram of a base station according to an embodiment of the present invention. The base station described in this embodiment of the present invention includes a memory 1000 and a processor 2000. The memory 1000 is connected to the processor 2000.

The memory 1000 is configured to store a set of program code.

The processor 2000 is configured to invoke the program code stored in the memory 1000, to perform the following operations:

determining at least one user equipment UE that occupies an uplink subframe on an unlicensed carrier and that is in at least one UE scheduled by a base station in a reference subframe, where the uplink subframe is an uplink subframe in which at least one UE scheduled by the base station in the reference subframe feeds back a hybrid automatic repeat request HARQ status for the reference subframe; and determining a contention window size CWS in clear channel assessment CCA for downlink transmission based on a HARQ status of the at least one UE that occupies the uplink subframe.

In some feasible implementations, the processor 2000 is specifically configured to:

if it is detected that at least one UE scheduled by the base station in the reference subframe occupies a HARQ resource in the uplink subframe to feed back a HARQ status, determine that the at least one UE that occupies the HARQ resource in the uplink subframe to feed back the HARQ status occupies the uplink subframe, where the HARQ resource is a physical layer resource carrying the HARQ status fed back by the UE.

In some feasible implementations, the processor 2000 is specifically configured to:

if it is detected that at least one UE scheduled by the base station in the reference subframe does not occupy a HARQ resource in the uplink subframe to feed back a HARQ status, and that the at least one UE that does not occupy the HARQ resource in the uplink subframe to feed back the HARQ status occupies an uplink resource other than the HARQ resource in the uplink subframe, determine that the at least one UE that occupies the uplink resource other than the HARQ resource in the uplink subframe occupies the uplink subframe, where the HARQ resource is a physical layer resource carrying the HARQ status fed back by the UE.

In some feasible implementations, the processor 2000 is specifically configured to:

if it is detected that the UE that does not occupy the HARQ resource in the uplink subframe to feed back the HARQ status sends a demodulation reference signal DMRS, determine that the UE occupies the uplink resource other than the HARQ resource in the uplink subframe;

if it is detected that the UE that does not occupy the HARQ resource in the uplink subframe to feed back the HARQ status sends uplink service information on a physical uplink shared channel PUSCH, determine that the UE occupies the uplink resource other than the HARQ resource in the uplink subframe; or if it is detected that the UE that does not occupy the HARQ resource in the uplink subframe to feed back the HARQ status sends uplink control information on a physical uplink control channel PUCCH, determine that the UE occupies the uplink resource other than the HARQ resource in the uplink subframe.

In some feasible implementations, the detected uplink control information sent on the PUCCH by the UE that does not occupy the HARQ resource in the uplink subframe to feed back the HARQ status includes: a scheduling request SR and/or channel state information CSI.

In some feasible implementations, the processor 2000 is specifically configured to:

determine that the at least one UE occupies the uplink subframe, if it is detected that at least one UE scheduled by the base station in the reference subframe does not occupy a HARQ resource in the uplink subframe to feed back a HARQ status, and a CWS in CCA performed by the at least one UE for the uplink subframe is not greater than a first preset threshold, or an initial value of a backoff counter generated based on CWS performed by the at least one UE for the uplink subframe is not greater than a second preset threshold, where the HARQ resource is a physical layer resource carrying the HARQ status fed back by the UE.

In some feasible implementations, the processor 2000 is specifically configured to:

determine that the at least one UE occupies the uplink subframe, if it is detected that at least one UE scheduled by the base station in the reference subframe does not occupy the HARQ resource in the uplink subframe to feed back the HARQ status and does not occupy the uplink resource other than the HARQ resource, and a CWS in CCA performed by the at least one UE for the uplink subframe is not greater than a first preset threshold, or an initial value of a backoff counter generated based on CWS performed by the at least one UE for the uplink subframe is not greater than a second preset threshold.

In some feasible implementations, the processor 2000 is specifically configured to:

receive report information sent by at least one UE scheduled by the base station in the reference subframe, where the report information is used to indicate that the at least one UE occupies the uplink subframe; and determine that the at least one UE occupies the uplink subframe.

During specific implementation, the base station described in this embodiment of the present invention may be configured to execute the implementation described in the embodiment of the method for determining a contention window size in clear channel assessment provided in the embodiments of the present invention. For details, refer to the implementation described in each step in the method embodiment, and details are not described herein again.

In this embodiment of the present invention, the base station may determine, by using a plurality of implementations, one or more UEs that occupy the uplink subframe on the unlicensed carrier and that are in a plurality of UEs scheduled in the reference subframe, and determine the CWS in the CCA for the downlink transmission based on a HARQ status of each UE that occupies the uplink subframe. The base station can determine whether that the HARQ status of the UE is the DTX state is caused because the LBT fails or because the PDCCH detection fails; ignore the DTX state caused because the LBT fails; and denote, as the NACK state, the DTX state caused because the PDCCH detection fails, and add the NACK state into the HARQ status set for determining the CWS, so as to improve accuracy of determining the CWS for the downlink transmission, and reduce a probability of increasing a waiting time of the base station due to an adjusted excessively large CWS.

A person of ordinary skill in the art may understand that all or some of the processes in the methods in the embodiments can be implemented by a computer program instructing related hardware. The program may be stored in a computer readable storage medium. When the program runs, the processes of the methods in the embodiments are performed. The foregoing storage medium may be: a magnetic disk, an optical disc, a read-only memory (ROM), a random access memory (RAM), or the like.

What is disclosed above is merely examples of the embodiments of the present invention, and certainly is not intended to limit the protection scope of the present invention. Therefore, equivalent variations made in accordance with the claims of the present invention shall fall within the scope of the present invention.

What is claimed is:

1. A method, comprising:
   detecting, by a base station from at least one user equipment (UE) in an uplink subframe on an unlicensed carrier, at least one hybrid automatic repeat request (HARQ) status feedback information corresponding to downlink data transmission, wherein the at least one UE is scheduled for the downlink data transmission, and the downlink data transmission is in a reference subframe; and
   determining, by the base station, a contention window size (CWS) in clear channel assessment (CCA) for next downlink data transmission based on at least one first HARQ status feedback information from at least one first UE without considering any second HARQ status feedback information corresponding to at least one second UE, wherein the at least one first HARQ status feedback information from the at least one first UE has been detected, none of the second HARQ status feedback information from the at least one second UE has been detected, the at least one UE includes the at least one first UE and the at least one second UE, and the at least one first UE and the at least one second UE are separate UEs.

2. The method according to claim 1, wherein that the at least one first HARQ status feedback information has been detected from the at least one first UE, comprises:
   the at least one first HARQ status feedback information has been detected on at least one HARQ resource in the uplink subframe, wherein
   the at least one HARQ resource is a physical layer resource carrying the at least one first HARQ status feedback information.

3. The method according to claim 1, wherein that the at least one first HARQ status feedback information has been detected from the at least one first UE, comprises:
   the at least one first HARQ status feedback information has been detected on at least one uplink resource in the uplink subframe, wherein
   the at least one uplink resource is different from a HARQ resource, and the HARQ resource is a physical layer resource carrying the at least one first HARQ status feedback information.

4. The method according to claim 3, wherein that the at least one first HARQ status feedback information has been detected on at least one uplink resource in the uplink subframe comprises:
   the at least one first HARQ status feedback information has been detected when at least one demodulation reference signal (DMRS) in the uplink subframe has been received;
   the at least one first HARQ status feedback information has been detected when uplink service information on a physical uplink shared channel (PUSCH) has been received; or
   the at least one first HARQ status feedback information has been detected when uplink control information on a physical uplink control channel (PUCCH) has been received.

5. The method according to claim 4, wherein the uplink control information comprises: at least one of a scheduling request (SR) or channel state information (CSI).

6. A base station, comprising a memory and a processor, wherein the memory is connected to the processor;
   the memory is configured to store a set of program code; and
   the processor is configured to invoke the program code stored in the memory, to perform the following operations:
   detecting from at least one user equipment (UE) in an uplink subframe on an unlicensed carrier, at least one hybrid automatic repeat request (HARQ) status feedback information corresponding to downlink data transmission, wherein the at least one UE is scheduled for the downlink data transmission, and the downlink data transmission is in a reference subframe;
   determining a contention window size (CWS) in clear channel assessment (CCA) for next downlink data transmission based on at least one first HARQ status feedback information from at least one first UE without considering any second HARQ status feedback information corresponding to at least one second UE, wherein the at least one first HARQ status feedback information from the at least one first UE has been detected, none of the second HARQ status feedback information from the at least one second UE has been detected, the at least one UE includes the at least one first UE and the at least one second UE, and the at least one first UE and the at least one second UE are separate UEs.

7. The base station according to claim 6, wherein that the at least one first HARQ status feedback information has been detected from the at least one first UE, comprises:
the at least one first HARQ status feedback information has been detected on at least one HARQ resource in the uplink subframe, wherein the at least one uplink resource is different from a HARQ resource, and the at least one HARQ resource is a physical layer resource carrying the at least one first HARQ status feedback information.

8. The base station according to claim 6, wherein that the at least one first HARQ status feedback information has been detected from the at least one first UE, comprises: the at least one first HARQ status feedback information has been detected on at least one uplink resource in the uplink subframe, wherein the at least one uplink resource is different from a HARQ resource, and the HARQ resource is a physical layer resource carrying the at least one HARQ status feedback information.

9. The base station according to claim 8, wherein the at least one first HARQ status feedback information has been detected when at least one demodulation reference signal (DMRS) in the uplink subframe has been received;
the at least one first HARQ status feedback information has been detected when uplink service information on a physical uplink shared channel (PUSCH) has been received; or
the at least one first HARQ status feedback information has been detected when uplink control information on a physical uplink control channel (PUCCH) has been received.

10. The base station according to claim 9, wherein the uplink control information comprises: at least one of a scheduling request (SR) or channel state information (CSI).

11. A non-transitory computer readable storage medium comprising a computer program, which when executed by a computer, causes the computer to perform:
detecting from at least one user equipment (UE) in an uplink subframe on an unlicensed carrier, at least one hybrid automatic repeat request (HARQ) status feedback information corresponding to downlink data transmission, wherein the at least one UE is scheduled for the downlink data transmission, and the downlink data transmission is in a reference subframe;
determining, a contention window size (CWS) in clear channel assessment (CCA) for next downlink data transmission based on at least one first HARQ status feedback information from at least one first UE without considering any second HARQ status feedback information corresponding to at least one second UE, wherein the at least one first HARQ status feedback information from the at least one first UE has been detected, none of the second HARQ status feedback information from the at least one second UE has been detected, the at least one UE includes the at least one first UE and the at least one second UE, and the at least one first UE and the at least one second UE are separate UEs.

12. The non-transitory computer readable storage medium according to claim 11, wherein that the at least one first HARQ status feedback information has been detected form the at least one first UE, comprises:
at least one first HARQ status feedback information has been detected on at least one HARQ resource in the uplink subframe, wherein the at least one uplink resource is different from a HARQ resource, and the HARQ resource is a physical layer resource carrying the at least one first HARQ status feedback information.

13. The non-transitory computer readable storage medium according to claim 11, wherein that the at least one first HARQ status has been detected from the at least one first UE, comprises:
the at least one first HARQ status feedback information has been detected on at least one uplink resource in the uplink subframe, wherein the at least one uplink resource is different from a HARQ resource, and the HARQ resource is a physical layer resource carrying the at least one HARQ status feedback information.

14. The non-transitory method according to claim 13, wherein
the at least one first HARQ status feedback information has been detected when at least one demodulation reference signal (DMRS) in the uplink subframe has been received;
the at least one first HARQ status feedback information has been detected when uplink service information on a physical uplink shared channel (PUSCH) has been received; or
the at least one first HARQ status feedback information has been detected when uplink control information on a physical uplink control channel (PUCCH) has been received.

15. The base station according to claim 14, wherein the uplink control information comprises: at least one of a scheduling request (SR) or channel state information (CSI).

* * * * *